United States Patent
Gautier et al.

(10) Patent No.: US 9,650,983 B2
(45) Date of Patent: May 16, 2017

(54) METHOD OF CONTROLLING FUEL INJECTION IN AN INTERNAL COMBUSTION ENGINE

(75) Inventors: Thomas Gautier, Yutz (FR); Didier Gautier, Saint Ay (FR)

(73) Assignee: DELPHI TECHNOLOGIES, INC., Troy, MI (US)

(*) Notice: Subject to any disclaimer, the term of this patent is extended or adjusted under 35 U.S.C. 154(b) by 755 days.

(21) Appl. No.: 13/996,628

(22) PCT Filed: Dec. 6, 2011

(86) PCT No.: PCT/EP2011/071893
§ 371 (c)(1),
(2), (4) Date: Aug. 1, 2013

(87) PCT Pub. No.: WO2012/084491
PCT Pub. Date: Jun. 28, 2012

(65) Prior Publication Data
US 2013/0325301 A1    Dec. 5, 2013

(30) Foreign Application Priority Data
Dec. 24, 2010   (EP) ..................... 10196968

(51) Int. Cl.
G06F 7/00        (2006.01)
G06F 17/00       (2006.01)
(Continued)

(52) U.S. Cl.
CPC ....... F02D 41/3005 (2013.01); F02D 41/247 (2013.01); F02D 41/2438 (2013.01);
(Continued)

(58) Field of Classification Search
CPC ............. F02D 41/2441; F02D 41/3005; F02D 41/403; F02D 41/247; Y02T 10/44
(Continued)

(56) References Cited

U.S. PATENT DOCUMENTS 4,788,960 A * 12/1988 Oshizawa ............. F02D 41/008
                                              123/357
5,747,684 A *  5/1998 Pace ...................... F02M 65/00
                                              73/114.49
(Continued)

FOREIGN PATENT DOCUMENTS

EP    1344923 A2   9/2003
EP    1918558 A1   5/2008

OTHER PUBLICATIONS

International Search Report dated Feb. 15, 2012, PCT/EP2011/071893.

Primary Examiner — Mahmoud Gimie
Assistant Examiner — David Hamaoui
(74) Attorney, Agent, or Firm — Joshua M. Haines

(57) ABSTRACT

A method of controlling fuel injection in an internal combustion engine having at least one cylinder with an associated fuel injector for performing injection events is proposed, wherein for each injection event a pulse width is determined with which the injector is kept open to spray a desired quantity of fuel. When the quantity of fuel of a given fuel injection event is greater than a learning threshold, a split fuel injection is performed, whereby a first, low injection pulse and a second, complementary injection pulse are executed. Data representative of a closing time and/or an opening time of the fuel injector is determined in respect of the first, low injection pulse and a learned correction value is elaborated based on the closing time and/or opening time, the learned correction value being subsequently used for injection control.

12 Claims, 4 Drawing Sheets

(51) Int. Cl.
  *F02D 41/30* (2006.01)
  *F02D 41/24* (2006.01)
  *F02D 41/40* (2006.01)

(52) U.S. Cl.
  CPC ........ *F02D 41/402* (2013.01); *F02D 41/2441* (2013.01); *Y02T 10/44* (2013.01)

(58) Field of Classification Search
  USPC ......... 701/104, 150; 123/299, 472, 490, 674
  See application file for complete search history.

(56) References Cited

U.S. PATENT DOCUMENTS

| | | | |
|---|---|---|---|
| 6,116,227 A * | 9/2000 | Yoshioka | F02D 41/2461 123/674 |
| 6,244,241 B1 * | 6/2001 | Mamiya | F02D 41/2461 123/295 |
| 6,513,320 B1 * | 2/2003 | Nishimura | F01N 3/0842 123/299 |
| 6,755,176 B2 * | 6/2004 | Takeuchi | F02D 41/0085 123/299 |
| 7,021,278 B2 | 4/2006 | Ishizuka et al. | |
| 7,089,908 B2 * | 8/2006 | Fujieda | F01L 1/34 123/299 |
| 7,464,690 B1 * | 12/2008 | Reitz | F02D 41/3035 123/299 |
| 7,552,709 B2 * | 6/2009 | Fujii | F02D 41/2438 123/299 |
| 7,657,361 B2 * | 2/2010 | Inoue | F02D 41/1498 123/436 |
| 8,527,182 B2 * | 9/2013 | Minami | F02D 41/1402 123/434 |
| 8,862,367 B2 * | 10/2014 | Toyohara | F02D 41/247 123/478 |
| 8,958,973 B2 * | 2/2015 | Katsurahara | F02D 41/1454 123/299 |
| 8,977,472 B2 * | 3/2015 | Kita | F02D 41/32 701/104 |
| 2006/0107936 A1 | 5/2006 | Mazet | |
| 2010/0030454 A1 | 2/2010 | Olbrich | |
| 2010/0065022 A1 * | 3/2010 | Toner | F02D 41/2096 123/490 |

* cited by examiner

METHOD OF CONTROLLING FUEL INJECTION IN AN INTERNAL COMBUSTION ENGINE

FIELD OF THE INVENTION

The present invention generally relates to internal combustion engines and more generally to injection control in such engines.

BACKGROUND OF THE INVENTION

The contemporary design of spark ignited internal combustion engines must cope with the increasingly stringent regulations on pollutant emission. Accordingly, automotive engineers strive for designing engines with low fuel consumption and low emission of pollutants, which implies including electronic devices capable of monitoring the combustion performance and emissions in the exhaust gases.

The issue of fuel economy has been addressed i.a. by varying the injection schemes. Currently, direct injection engines and in particular gasoline stratified charge engines are considered to be very efficient in terms of fuel economy.

One requirement to reduce emissions from a spark ignited internal combustion engine is an accurate control of the combustion air/fuel ratio. This is usually done by metering a precisely controlled amount of fuel based on a measured or inferred air charge mass inducted into the engine; many control schemes are known in the art to control the air/fuel ratio. It is e.g. customary to install an oxygen sensor in the engine exhaust line pipe and to use the sensor output as a feedback signal for closed loop fuel control.

U.S. Pat. No. 6,382,198 describes a direct injection engine with an enhanced fuel control using a single oxygen sensor as combustion performance indicator. The Engine Control Module (ECM) is capable of determining the actual air/fuel ratio corresponding to each individual cylinder from the combined flow of exhaust gases; this function is known as ICFC (Individual Cylinder Fuel Control). Conventionally, the ECM develops a fuel command pulse width for each of the injectors that corresponds to the driver's requested torque. For this purpose, a lookup table is used that stores fuel amounts in function of e.g. engine speed, manifold air pressure, and other parameters. The ECM also uses a table storing closed-loop fuelling corrections, which is known as block learning memory (BLM). As it is known in the art, the BLM table entries are determined based on the oxygen sensor response, which when adequately filtered, provides a measure of the deviation of the average engine air/fuel ratio from stoichiometry (average here means for a bank, i.e. a set of cylinders connected to the same exhaust manifold). The values from the base table and BLM are used to determine a global fuel amount. Additionally, an ICFC module determines, also based on the oxygen sensor response, a cylinder specific fuel error that is used to develop individual cylinder correction factors applied to the global fuel. This final fuel amount is then converted into a pulse width command, which typically involves a lookup table storing fuel amounts vs. pulse widths.

This control strategy is already quite sophisticated and does indeed allow an enhanced control of fuel injection. A problem that however has recently arisen in injection control is that advanced, complex fuel injectors, in particular those used for stratified charge engines, do not have easily predictable flow performances, which results into significant performance deviation or variability between injectors of a same design.

A further parameter affecting the injected fuel quantity is the response time of the injector. Indeed, conventionally with electromagnetic actuators a certain time period elapses between application of the command signal and the moment the actuator actually starts moving; or between the moment the command signal ends and the injector actually reaches its closed position. The knowledge of the response times (or response delays) at switch-on and switch-off thus allows for a more precise control of the actuator. WO 03/023211 e.g. describes a method of determining response times of electromagnetic devices. The determination of injector response times at switch on and switch off based on current detection is described; the determination of the response time at closing is also described based on voltage detection.

Deviation and variability between injectors are usually due to the dispersion of the injectors' characteristics linked to the production process spread and/or to the time-drift variations of the same characteristics due to ageing. Thus, fuel injector flow variations need to be corrected.

The problem of fuel variability is particularly critical for low fuel injections, i.e. when injecting small or minute fuel amounts.

OBJECT OF THE INVENTION

The object of the present invention is to provide a method of controlling fuel injection in an internal combustion engine, which allows fuel injection with better accuracy namely at low fuel injections.

This object is achieved by a method as claimed in claim 1.

SUMMARY OF THE INVENTION

The present invention relies in part on previous observations made by the present Applicant that the accuracy of low/minute fuel injections can indeed be improved by detecting more precisely than before response timings of the pintle lift event of the injector and that injector response time data such as closing time data and/or opening time data can serve to correct the injection pulse width that is used to inject a desired quantity of fuel in the combustion chamber.

Accordingly, the present invention relates to a method of controlling fuel injection in an internal combustion engine having at least one cylinder with an associated fuel injector for performing injection events, wherein for an injection event a pulse width is determined, with which the injector is kept open to spray the desired quantity of fuel.

According to an important aspect of the present method, when the quantity of fuel of a given fuel injection event is greater than a learning threshold, a split fuel injection is performed, whereby a first, low injection pulse and a second, complementary fuel injection pulse are executed, and wherein data representative of a closing time and/or an opening time of the fuel injector is determined in respect of said first, low injection pulse and learned correction value(s) is/are determined based on said data, said learned correction value(s) being subsequently used for the injection control, and namely for injection of minute or low fuel quantities.

Hence, the present method exploits the closing time or opening time information, preferably both, to correct the fuel injections and is of particular interest for performing injection of minute fuel quantities, where it is known that the flow control is critical in modern fuel injectors. Nevertheless, the principle of closing and opening time correction can be applied over the whole range of pulse widths.

It is to be noted that in the present method, the actual pintle opening/closing times for minute injections is preferably not learned when the injection of such minute fuel quantities are requested by the engine management, but the opportunity to learn a minute injection closing time and opening time is created during larger fuel injections.

Therefore, the present method takes advantage of a fuel injection event requiring injection of a fuel quantity larger than the learning threshold, to split the injection into a first, low injection pulse and a second injection pulse that delivers the complementary amount of fuel to match the desired quantity of fuel (could be more than one second pulse). And the closing and/or opening time of the first, low injection pulse may then be detected and hence learned. In doing so, one can study the switching behaviour of the injector and namely the closing time, resp. opening time, thereof, while minimising the impact on the combustion and driveability.

The learned timing values allow elaborating learned correction values that can be advantageously used for the injection control and namely for low injection pulses. First, learned correction values may be elaborated in respect of the closing times on the one hand, and second, learned correction values may be elaborated in respect of the opening times on the other hand. Preferably, the learned correction values take into account both the opening and closing times.

The terms "minute" and "low" used herein with respect to fuel injection and injection pulses designate injection pulses of low fuel quantities, which are achieved through brief pintle openings and where the pintle is mainly in a transitory position between the fully open position and the closed position. Performing such low fuel injections involves operating the injector in the "ballistic" domain, where closing and opening time correction has appeared to be particularly advantageous. For current injectors, injections of fuel masses of up to 5 or 6 mg involve operation in the ballistic domain.

As it will be understood by those skilled in the art, a number of conditions are preferably set to enable or disable this learning mode where learned correction values may be determined. Firstly, the split injection required for learning closing and/or opening times is preferably only carried out during an intake stroke of the engine. Therefore, the present method is particularly designed for gasoline engines. Additionally, the learning of closing and/or opening times is preferably disabled during engine crank phase, or if any malfunctions are detected.

Preferably, determined closing and opening times are normalized. In this connection, learned closing/opening times may be corrected for pressure and temperature, and then stored. Preferably, a table of learned closing times is provided in the engine management system and used for injection control, said table of learned closing times giving normalized, average closing time values for each injector (or cylinder) and a set of pulse widths corresponding to minute fuel injections. Having regard to current injector technologies, it is considered that determining and storing one opening time per injector is sufficient. However, closing times may also be stored in function of fueling quantities, resp. pulse widths.

In one embodiment, the engine is controlled with a calibrated map of closing times and opening times, and a pulse width correction is performed based on a difference between the calibrated and learned closing times as well as calibrated and learned opening times. Preferably, the pulse width may be corrected according to the following formula:

$$PW_{corr} = PW + g_1 \cdot (CT_{cal} - CT_{learned}) - g_2 \cdot (OT_{cal} - OT_{learned})$$

Where $PW_{corr}$ is the pulse width value corrected for opening and closing delays, PW is the base pulse width not corrected for closing and opening time variation, $CT_{cal}$ and $OT_{cal}$ are the calibrated, reference closing and opening times, $CT_{learned}$ and $OT_{learned}$ are the learned closing and opening times, and $g_1$ and $g_2$ is are a gain factors; $CT_{cal}$ and $CT_{learned}$ relating to PW. The gain factor $g_1$ is preferably calibrated in function of pulse width as well.

As it will be understood, the terms relating to the learned opening time or closing time in the above formula may be suppressed in case they are unknown or correction in respect of opening or closing timing is not desired.

In practice, the engine management system will be configured to learn the various cells of the table of learned closing times as well as the table of learned opening times. Depending on the cell to be learned, the pulse width of the low injection pulse may significantly vary. Therefore, the learning threshold may be calibrated and depend on the amount of fuel to be learned. It will be understood that the comparison of the quantity of fuel to the learning threshold may be expressed in fuel mass, pulse width or any other appropriate parameter related to the fuel quantity to be injected.

The determination of the closing time of the first, low injection pulse may advantageously be based on the monitoring of the voltage of the respective fuel injector. However, any other method, currently existing or to be developed, may be used to determine the closing time or opening time of the injector pintle.

The thus learned closing and opening time values and the ability to develop learning correction value will then be advantageously used in fuel injection control for injecting low fuel amounts as may be required e.g. for catalyst light off or stratified charge combustion.

BRIEF DESCRIPTION OF THE DRAWINGS

The present invention will now be described, by way of example, with reference to the accompanying drawings, in which.

DETAILED DESCRIPTION OF A PREFERRED EMBODIMENT

Figure 1:
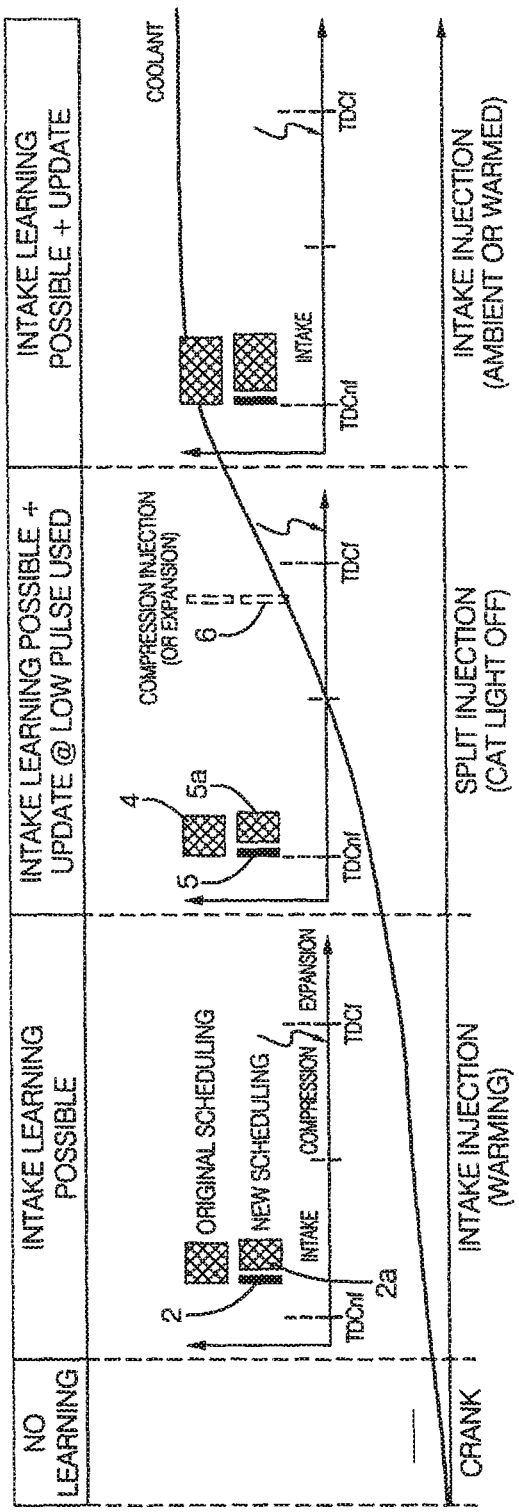
FIG. 1: is a diagram illustrating learning and non-learning conditions of injector closing and opening times in accordance with a preferred variant of the present method.

The present method relates to the control of fuel injection in an internal combustion engine and aims at improving the accuracy of fuel injections and namely of minute fuel injections.

The present invention is based partly on the previous observation made by the present Applicant that the accuracy of fuel injections can be improved by detecting more precisely than before the response delays at closing and opening during the pintle lift event of the injector.

It has indeed been observed that fuel delivery is primarily determined by the pulse width and the closing delay of the injector pintle, after the pulse width ends. This closing delay or closing time represents the time required, after the end of the pulse width control signal, for the pintle to reach its closed position. It is desirable for the closing response to be as short as possible, such that when the pulse width approaches zero, the amount of fuel delivered similarly approaches zero.

Additionally, variation in the closing response not only affects the quantity of fuel delivered, but is also an indicator of variation in the injector electrical and/or mechanical response. Such information is beneficial in the development of injectors to assess and diagnose their variability and can be used in fuel control strategies.

Opening delay (or opening time), i.e. the time span between application of the opening signal and the actual setting into motion of the pintle, similarly affects the injected fuel quantity. However, the opening delay tends to reduce the injected fuel quantity whereas the closing delay tends to increase the latter.

As it has further been observed by the present Applicant, the closing of a fuel injector can be detected from the injector terminal voltage signature, as will be explained below.

While the closing time and opening time are thus valuable information for injection control, this information has to be properly used in the engine management system. The problem of fuel variability is particularly acute at low fuel flows, and it is desirable that any injection correction measure be available as soon as minute fuel injections are required. And it is preferable to acquire the learned correction values as soon as possible.

The following presents a preferred method of controlling fuel injection in a gasoline engine, which allows learning injector closing and opening times and provides for pulse width correction based on learned values of opening and closing times.

As it is well known in the art and summarised in the introductory part of the present application with reference to U.S. Pat. No. 6,382,198, in conventional engine management strategies a fuel command pulse width is determined for each injection event in an engine cycle. Pulse widths are mapped in function of fuel amounts, the latter depending on the requested torque and being corrected using known measures such as e.g. BLM and ICFC.

Hence, for any fuel injection to be performed a pulse width is generated to command a corresponding injector opening duration in order to deliver a predetermined fuel amount.

The present method employs the injector closing time and opening time information to improve the injection of fuel quantities, namely of low fuel quantities. A learned correction value is determined that is then applied to the pulse width determined by conventional methods.

To learn the injector closing and/or opening times at low fuel flows, the present invention proposes splitting a comparatively large fuel injection into a first, low injection pulse and a second, complementary fuel injection pulse. In doing so, it is possible to learn the closing time and opening time of a minute fuel injection pulse, while the delivery of the desired fuel mass is still achieved through the complementary second injection pulse. This split injection is only carried out in respect of an initially scheduled injection event occurring in the intake stroke. Therefore, split injection does not disturb the combustion nor driveability.

A learning threshold is used to decide whether or not the amount of fuel to be injected is sufficient to allow split injection in a way that will not perturb the combustion. The error on the complementary fuel injection, should preferably be comparatively substantially greater than the first fuel injection. Preferably, the quantity of fuel of the complementary injection pulse is at least twice that of the first, low injection pulse. Accordingly, depending on the pulse width, respectively on the amount of fuel, to be learned, the learning threshold may vary. A calibrated table of learning thresholds may thus be used, depending on the amount of fuel to be used. In practice, the comparison to the learning threshold may be done based on pulse widths, fuel amounts or other parameters proportional to the fuel mass.

The split injection used in the present method is illustrated in FIG. 1, where in order to learn a minute fuel injection, a fuel amount that would normally be injected in one pulse (original scheduling) is split into a first minute pulse 2 and a complementary pulse 2a. And the closing time of the first pulse 2 is then detected.

As it will be understood by those skilled in the art, industrial application of the present method will preferably imply predetermined conditions on whether to enable the learning or not, and under which conditions the learned correction values may be used by the engine management. For example, still with reference to FIG. 1, any learning of closing or opening time is preferably disabled during engine crank. Another preferable prerequisite for enabling learning is that the injection event is scheduled during the intake stroke.

As further illustrated in FIG. 1, learning is possible in respect of intake stroke injections during engine warming and when the engine is warm (this temperature assessment may be based on coolant temperature). Another enabling condition may be that the fuel injectors are in a predetermined temperature range, an assessment which can also be based on the coolant temperature.

Learning is also possible in case of split injection for lighting off of the catalytic converter, in which case the initial, large fuel injection 4 is split into a first, low fuel injection pulse 5 and a second, complementary fuel injection 5a, while the retarded injection pulse 6 remains unchanged.

In doing so, it is thus possible to learn the closing time and/or opening time of minute fuel injection pulses while minimising the effect of the learning on combustion and driveability.

In the present embodiment, a table of learned closing times is used. This table is indicated 10 in FIG. 2 and is designed to store closing time values for each cylinder/injector corresponding to predefined pulse widths in the low fuel range. For example, as illustrated, closing time values may be stored that corresponds to 9 pulse width values covering a range of pulse widths corresponding to fuel amounts between 0.5 and 5 or 6 mg of fuel.

Reference 11 indicates a lookup table for injector learned opening times. In this case, one value representative of opening time/delay is considered to be sufficient per cylinder, i.e. the opening time is not function of the injected fuel quantity. Nevertheless, in other circumstances, one may use such table where the learned opening times are also function of pulse widths (i.e. dependent on fuel quantity).

Figure 2:
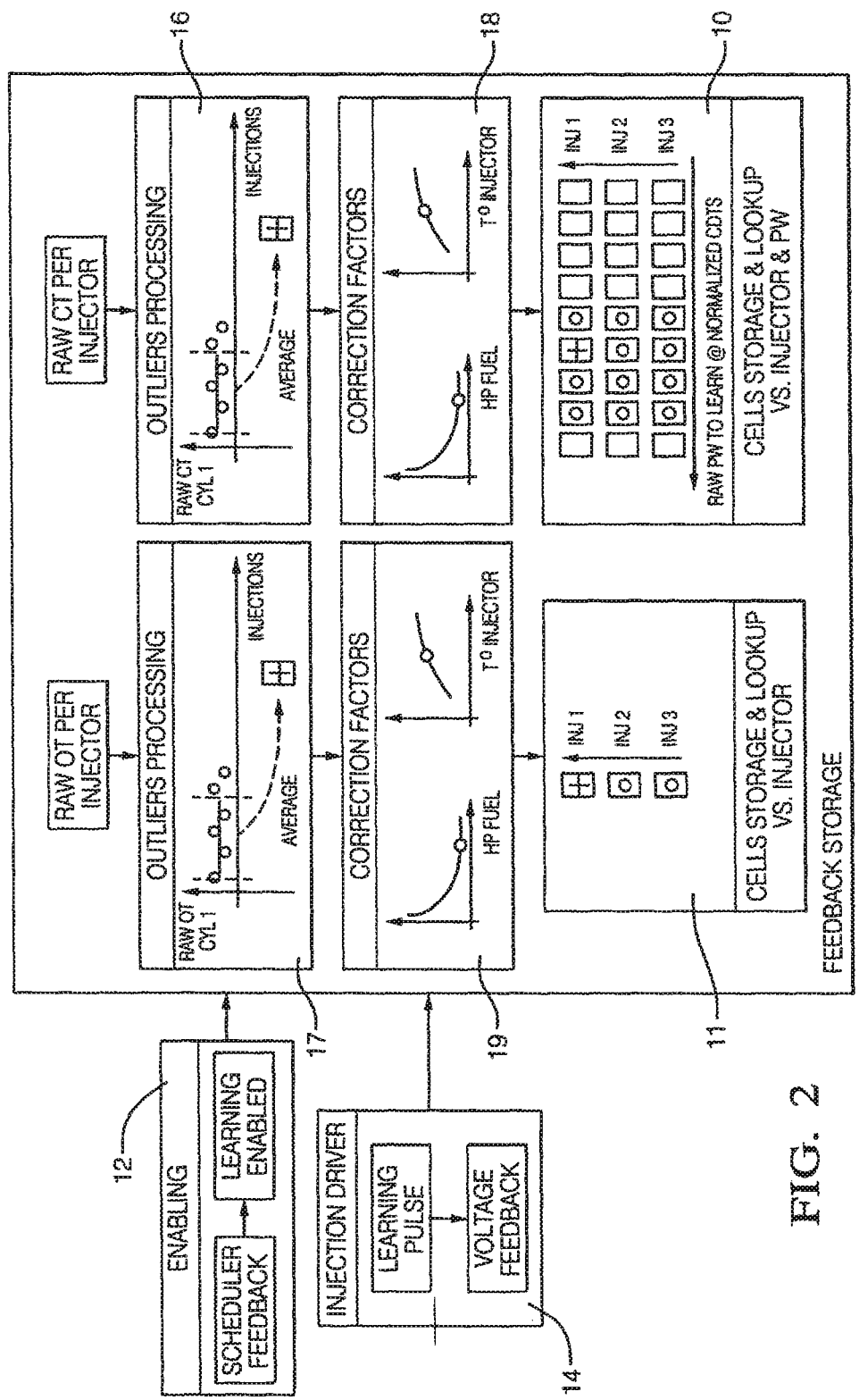
FIG. 2: is a block diagram illustrating the acquisition of learned closing and opening time tables.

As also represented in FIG. 2, when learning is enabled (box 12), split fuel injection is performed in accordance with the present invention to execute a first low injection pulse, the closing time of which is detected (box 14), followed by the complementary second fuel injection. And a raw closing time (rawCT) value is determined based on the voltage feedback, which is then stored for the associated cylinder and given pulse width (box 16). When a desired number of raw closing times, e.g. five, is obtained for a given pulse width, an average closing time is calculated. This average closing time value, is then corrected for pressure and temperature, i.e. normalized, (box 18) and stored in the relevant cell of table 10.

Similarly, a raw opening time value (raw OT) is determined from this first low pulse injection. Any appropriate method, currently existing or to be developed, may be used for determination of the opening delay, such as e.g. disclosed in WO 03/023211. The raw opening time value is stored for the associated cylinder (box 17). When a desired number of raw opening times has been acquired, e.g. five, an average raw opening time is calculated. This average opening time value is then corrected for pressure and temperature, i.e. normalized, (box 19) and stored in the relevant cell of table 11.

In the present variant, the injection control scheme also uses a table of calibrated closing times and a calibrated table of gains ($g_1$) to elaborate a learned correction value for the pulse width. These two tables are indicated respectively 20 and 22 in FIG. 3 and both of them depend on the mapped pulse width values determined by the engine management system in function of the desired amount of fuel. Reference sign 21 indicates a calibration of reference opening times at reference temperature.

Figure 3:
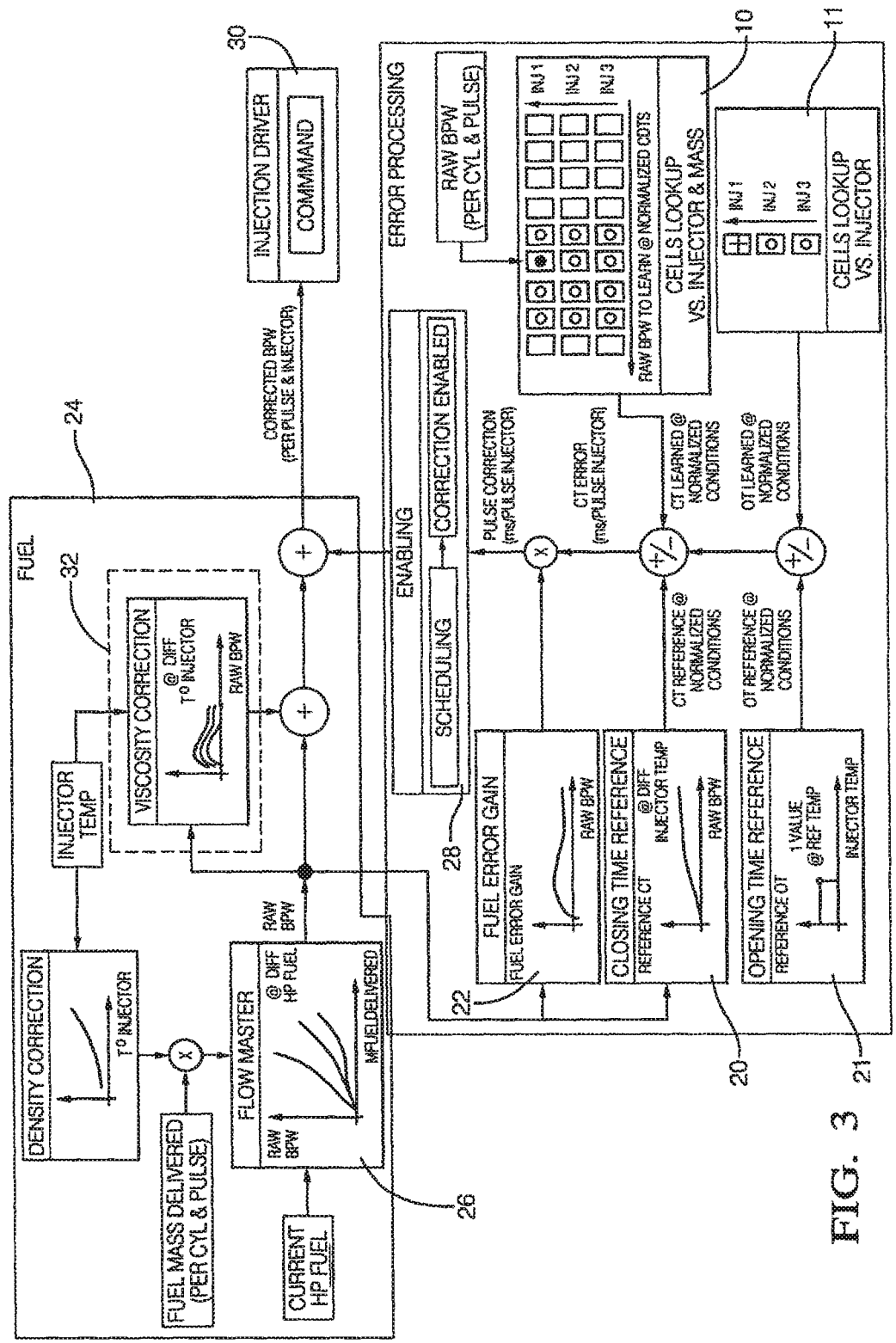
FIG. 3: is a block diagram illustrating a base pulse width correction in accordance with the present method.

The conventional determination of the mapped pulse width is summarized in box 24 of FIG. 3. A desired fuel mass—indicated "Fuel Mass delivered"—to be injected into a cylinder having been determined in function of a torque request, a density correction (taking into account the injector temperature) is applied to the Fuel Mass delivered and the resulting value is applied to a master flow table 26 giving the base pulse width corresponding to the desired fuel injection (also function of fuel pressure). This pulse width value is noted $_{raw}$BPW, which means the pulse width value as determined from the conventional engine management, but uncorrected for closing/opening time error.

If closing and opening time correction is enabled (box 28), the learned correcting value for the current pulse width is elaborated as follows. Based on the $_{raw}$BPW, a gain $g_1$ is read from table 22, a calibrated closing time $CT_{cal}$ is read from table 20 and a learned closing time $CT_{learned}$ is read from table 10. A gain $g_2$ is read from a memory (not shown), a calibrated opening time $OT_{cal}$ is read from table 21 and a learned opening time $OT_{learned}$ is read from table 11. A corrected BPW (noted $_{corr}$BPW) may then be calculated from the $_{raw}$BPW according to the following formula:

$$_{Corr}BPW = {}_{raw}BPW + g_1 \cdot (CT_{cal} - CT_{learned}) + g_2 \cdot (OT_{cal} - OT_{learned}).$$

The value $_{Corr}$BPW is then used in by the injection driving module (30) as command for controlling the injector opening time.

Reference sign 32 in FIG. 3 designates an optional viscosity correction, whereby $_{raw}$BPW in the above formula then means the $_{raw}$BPW as determined from Master flow map 24 and as corrected for viscosity.

With the present method, as soon as a learned closing time exists in table 10 for a given pulse width (and hence given fuel quantity) and/or a learned opening time exists in table 11, a correction may be applied to a scheduled injection event of the corresponding low fuel quantity.

As it will be understood, at the beginning of the engine running, the learned closing time table 10 will be empty, and the engine management may be programmed in any desired way to prioritise acquisition of certain closing times values with respect to others. The opening time values may be readily learned into table 11 since it is, in this variant, not BPW dependent.

Once the learned table 10 and 11 have been filled in, it may be desirable to periodically trigger an update of said tables to take into account injector ageing. Besides, the learned delays in table 10 or 11 may be reset and learned anew in case important exhaust fuelling errors detected when performing corrected minute fuel injections, or due to malfunctions in emission performance, or for any other appropriate reason.

As already mentioned, the determination of the injector pintle closing response, and more precisely the closing time, is preferably carried based on the voltage feedback from the injector. The voltage may be measured across the injector terminals. When the injector armature hits the seat and stops, there is a visible and measurable change in the slope of the injector voltage (see arrow in FIG. 4). One may take the derivative of the coil voltage and local maximum (the signal is generally a negative quantity) of the derivative of the coil voltage closely approximates the closing response time.

Figure 4:
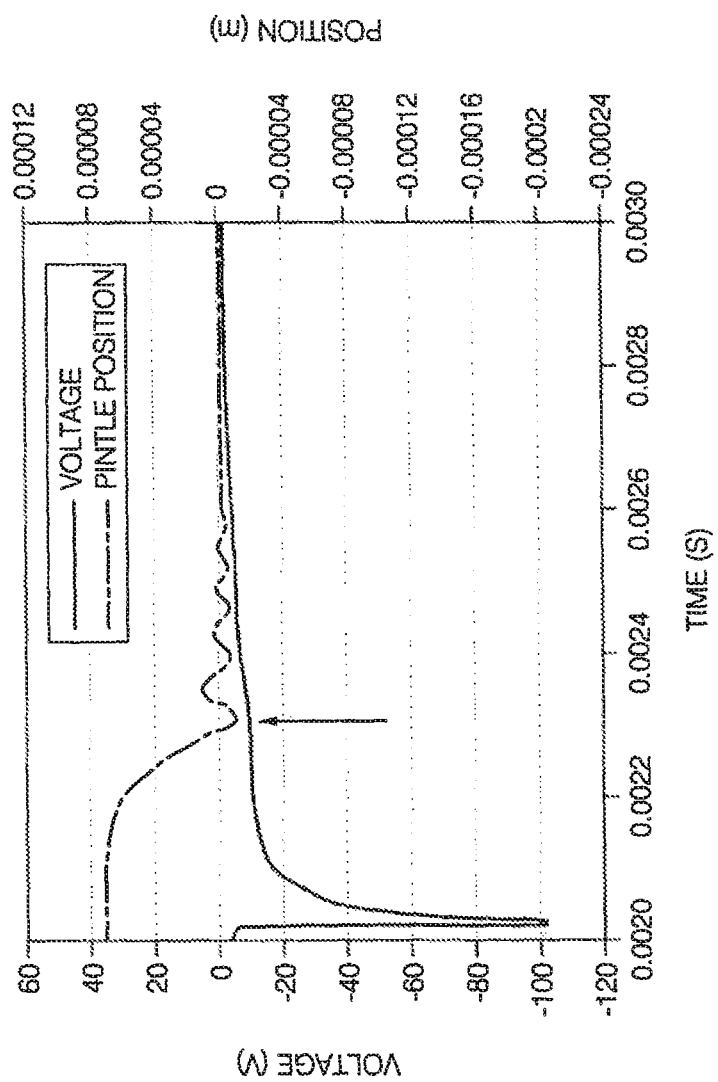
FIG. 4: is a graph representing the typical voltage waveform of the pintle position according to time and the corresponding voltage evolution.

The typical waveform of the pintle position and the corresponding voltage are shown on FIG. 4.

The perturbation in the voltage can be traced back to a change in the velocity term of the flux linkage $I \cdot dL/dx \cdot dx/dt$, where $dx/dt$ is the velocity of the armature, which is greatly reduced when the pintle closes. The measurements take place after the pulse has ended and the currents have gone to zero, leaving only eddy currents and trapped flux in the magnetic circuit. These conditions enable an easier sensing of the closing voltage signature.

Furthermore, it has been observed that fuel mass is primarily determined by the pulse width and the closing delay of the injector pintle, after the pulse width ends.

Thanks to the determination of the closing time, it is hence possible to adjust the pulse width to prevent flow variation from one injector to the others. Closing Time is then an excellent indicator of fuel flow: part with higher closing time will deliver more fuel than one with shorter closing time.

It may be noted that this voltage-based determination is adapted for solenoid-actuated fuel injectors, i.e. inductors having an inductance, which is the case of injectors currently on the market. Nevertheless, any other appropriate method may be used to determine the closing time.

As already stated, opening time values may be determined by any appropriate method.

The invention claimed is:

1. A method of controlling fuel injection in an internal combustion engine having at least one cylinder with an associated fuel injector for performing injection events, wherein for each injection event a pulse width is determined with which the injector is kept open to spray a desired quantity of fuel,
    wherein when the quantity of fuel of a given fuel injection event is greater than a learning threshold, a split fuel injection is performed, whereby a first, low injection pulse and a second, complementary injection pulse are executed, and
    wherein data representative of at least one of a closing time and an opening time of the fuel injector is determined in respect of said first, low injection pulse and a learned correction value is elaborated based on at least one of said closing time and said opening time, said learned correction value being subsequently used for injection control,
    wherein said learning threshold is calibrated as a function of the pulse width for which the closing time is to be learned.

2. The method according to claim 1, wherein the learned correction value is used for correcting low fuel injections.

3. The method according to claim 1, wherein the closing time determined for a first, low injection pulse is stored in correspondence with its corresponding pulse width.

4. The method according to claim 1, wherein a table of learned closing times is used, wherein average values of closing times are stored as a function of pulse width and cylinder number.

5. The method according to claim 1, wherein said learned correction value is added to a current base pulse width, said learned correction value being calculated as the product of a gain factor and the difference between a calibrated closing time and a learned closing time, less the product of another gain factor and the difference between a calibrated opening time and a learned opening time.

6. The method according to claim 1, wherein said engine is a gasoline engine.

7. The method according to claim 1, wherein said split injection fuel injection is fully performed in an intake stroke of said engine.

8. The method according to claim 1, wherein the determination of said closing time is based on the monitoring of the voltage of the respective fuel injector.

9. The method according to claim 2, wherein the closing time determined for a first, low injection pulse is stored in correspondence with its corresponding pulse width.

10. The method according to claim 9, wherein a table of learned closing times is used, wherein average values of closing times are stored as a function of pulse width and cylinder number.

11. The method according to claim 10, wherein said learned correction value is added to a current base pulse width, said learned correction value being calculated: as the product of a gain factor and the difference between a calibrated closing time and a learned closing time, less the product of another gain factor and the difference between a calibrated opening time and a learned opening time.

12. The method according to claim 11, wherein said split injection fuel injection is fully performed in an intake stroke of said engine.

* * * * *